US008756106B2

(12) United States Patent
Baril

(10) Patent No.: US 8,756,106 B2
(45) Date of Patent: Jun. 17, 2014

(54) REMOTE ORDERING SYSTEM

(75) Inventor: Daniel J. Baril, Hampton, NH (US)

(73) Assignee: E-Meal, LLC, Haverhill, MA (US)

( * ) Notice: Subject to any disclaimer, the term of this patent is extended or adjusted under 35 U.S.C. 154(b) by 88 days.

(21) Appl. No.: 13/618,619

(22) Filed: Sep. 14, 2012

(65) Prior Publication Data

US 2013/0246197 A1 Sep. 19, 2013

Related U.S. Application Data

(63) Continuation of application No. 13/102,756, filed on May 6, 2011, now abandoned, which is a continuation of application No. 12/406,743, filed on Mar. 18, 2009, now abandoned, which is a continuation-in-part of application No. PCT/US2007/088199, filed on Dec. 19, 2007, which is a continuation-in-part of application No. 11/774,611, filed on Jul. 8, 2007, now abandoned, which is a continuation-in-part of application No. 11/757,998, filed on Jun. 5, 2007, now Pat. No. 7,831,475.

(60) Provisional application No. 60/867,740, filed on Nov. 29, 2006.

(51) Int. Cl.
| G06Q 20/16 | (2012.01) |
| G06Q 30/06 | (2012.01) |
| G06Q 30/02 | (2012.01) |
| G06Q 50/12 | (2012.01) |
| G06Q 20/20 | (2012.01) |
| G06F 3/0482 | (2013.01) |

(52) U.S. Cl.
CPC ............ *G06Q 30/0641* (2013.01); *G06Q 30/06* (2013.01); *G06Q 30/0267* (2013.01); *G06Q 50/12* (2013.01); *G06Q 20/204* (2013.01); *G06Q 30/0601* (2013.01); *G06F 3/0482* (2013.01)
USPC ............................................... 705/16; 705/15

(58) Field of Classification Search
CPC ........ G06Q 10/02; G06Q 20/16; G06Q 20/18
USPC ....................................... 705/16, 2, 341, 343
See application file for complete search history.

(56) References Cited

U.S. PATENT DOCUMENTS

| 5,128,862 A * | 7/1992 | Mueller .......................... 705/15 |
| 7,171,192 B2 * | 1/2007 | Song et al. ................. 455/414.3 |
| 7,721,969 B2 * | 5/2010 | Johnson et al. .......... 235/472.01 |
| 2004/0143503 A1 * | 7/2004 | Suthar ............................. 705/15 |

OTHER PUBLICATIONS

Carola Vyhnak, Toronto S. "Restaurant Serves Diners by ESP it's a Computerized Ordering Device that Means Real 'Fast Food'." Toronto Star: 0. Apr. 10, 1989. ProQuest. Web. Mar. 6, 2014 (Attached).*

* cited by examiner

*Primary Examiner* — Scott Zare
*Assistant Examiner* — Rokib Masud
(74) *Attorney, Agent, or Firm* — Finch & Maloney PLLC

(57) ABSTRACT

A remote ordering system is provided using an electronic menu having a series of input devices associated with various menu items, and a wireless transmitter to send selected menu items to a receiving device for processing. A display to show selected menu items, an alpha-numeric keyboard, a non-cash payment device, and a printer for receipts are also contemplated for increased functionality. The menu may be remotely updated to reflect the customer's preferences or a change to the menu choices.

7 Claims, 19 Drawing Sheets

REMOTE ORDERING SYSTEM

CROSS REFERENCE TO RELATED APPLICATIONS

This application is a Continuation of U.S. patent application Ser. No. 13/102,756, filed on May 6, 2011, which is a is a Continuation of U.S. patent application Ser. No. 12/406,743, filed on Mar. 18, 2009, which is a Continuation-in-Part of PCT Application Serial No. PCT/US07/88199, filed on Dec. 19, 2007, and a Continuation-in-Part of U.S. patent application Ser. No. 11/774,611, filed on Jul. 8, 2007, which is a Continuation-in-Part of U.S. patent application Ser. No. 11/757,998, filed on Jun. 5, 2007, which issued as U.S. Pat. No. 7,831,475 on Nov. 9, 2010 and claims benefit of U.S. Provisional Application Ser. No. 60/867,740, filed on Nov. 29, 2006. Each patent and patent application cited herein is hereby incorporated by reference in its entirety.

FIELD OF TECHNOLOGY

The present invention relates generally to remote ordering systems, and more particularly to electronic menus.

BACKGROUND

Ordering from a menu typically includes reading from the menu and making a selection that must be remembered while waiting for an employee to come over and transcribe the order to a piece of paper. After the employee takes the order, the piece of paper is delivered to an order processing area to process the selections. The employee then delivers the selections, and at some later time, the employee must be present to receive payment for the selections. This reliance on the employee to deliver the order and be present for payment can significantly slow the ordering and payment process. The desire for more efficient order management and a streamlined customer experience has therefore led to the development of the present inventive concept.

SUMMARY

An ordering system that allows a customer to order and pay without the need of an employee or other wait-staff is provided. The ordering system can provide for updatable menus and can provide the facility owner with information regarding its customers.

In one aspect, a handheld electronic menu is provided, the menu comprising an electronic display for displaying both a first series of menu choices and a sub-series of menu choices, a plurality of switches, each switch positioned to be aligned with one of the menu choices and one of the sub-menu choices, a feedback mechanism for visually and/or audibly indicating selection of a menu choice, a microcontroller including embedded software for operating the menu, a transmitter for wirelessly transmitting selected menu choices to a central location, an integrated payment device, and a power supply for powering the display and the transmitter.

In another aspect a system is provided, the system including a menu that may include any combination of the features described above and a printer that is in communication with the menu.

In another aspect, a method for a customer to place an order at a restaurant without the use of wait staff is provided, the method comprising the steps of picking up a handheld electronic menu, reviewing a series of menu choices presented on a display, selecting a menu choice from the series of choices by activating a switch aligned with the menu choice, reviewing a series of sub-menu choices presented on the display, selecting a sub-menu choice by activating a switch aligned with the sub-menu choice, wirelessly transmitting an order to a central location wherein the order includes selected menu choices and sub-menu choices, and paying for the order via a payment device integral to the menu.

In another aspect a system is provided, the system including an electronic menu comprising an electronic display for displaying both a series of menu choices and a sub-series of menu choices, a plurality of switches, each switch positioned to be aligned with one of the menu choices and one of the sub-menu choices, a transmitter for wirelessly transmitting selected menu choices to a central location, an integrated payment device, a microcontroller including embedded software for operating the menu, a power supply for powering the display and the transmitter, and a central processor constructed and arranged to receive transmissions from the menu and to provide order information regarding customer orders to restaurant staff.

It is understood that different embodiments of the invention may include any combination of the elements described, even if a specific combination is not explicitly detailed herein.

BRIEF DESCRIPTION OF THE DRAWINGS

These and other features and advantages of the present invention will be better understood upon consideration of the following detailed description, taken in conjunction with the accompanying drawings, in which like reference characters refer to like parts throughout, and in which.

DETAILED DESCRIPTION

In one aspect an electronic menu and associated system components are provided. The electronic menu can be used in a variety of venues but will generally be discussed in reference to a restaurant location.

Figure 1:
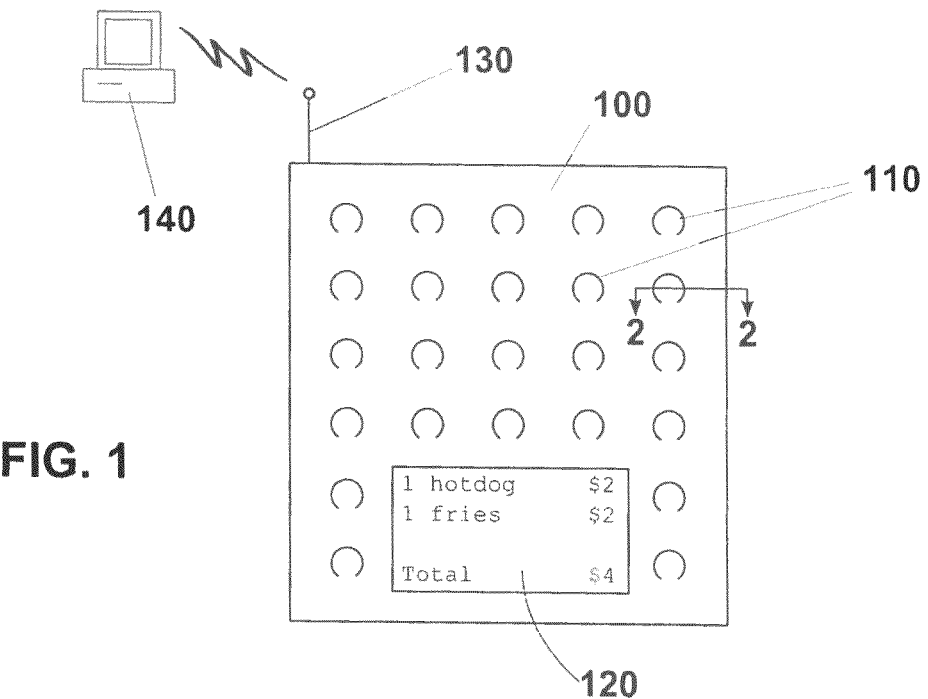
FIG. 1 shows a front view of a preferred embodiment of the invention.

In one embodiment, the invention includes an electronic menu 100 with selection means 110 in the form of membrane switches, a display 120, and a remote transmitting device 130, as seen in FIG. 1. A graphical overlay (not shown) is preferably printed upon the menu 100 overlaying the selection means 110 to provide various selections.

When a customer is seated at a table, menu 100 is made available to them from the wait staff or a docking station located in the restaurant. A food selection is made by utilizing a series of selection means 110 that correspond to selections for a desired meal. Separate selection means 110 can be included on the menu and be designated with appropriate markings to accomplish tasks such as signifying a completed order or calling a server to the table or to cycle through various other functions of the menu. The graphical overlay can be periodically replaced to reflect new selection options, and the membrane switch designations can be updated accordingly with appropriate software. Once the order is complete, the ordering information is sent to a receiving device for processing.

Figure 2:
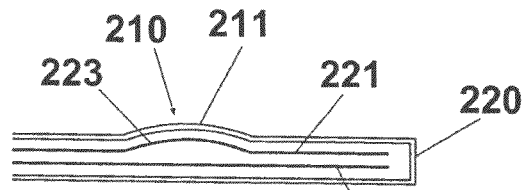
FIG. 2 shows a cross section of a portion of the preferred embodiment of FIG. 1 along line 2-2.
Figure 3:
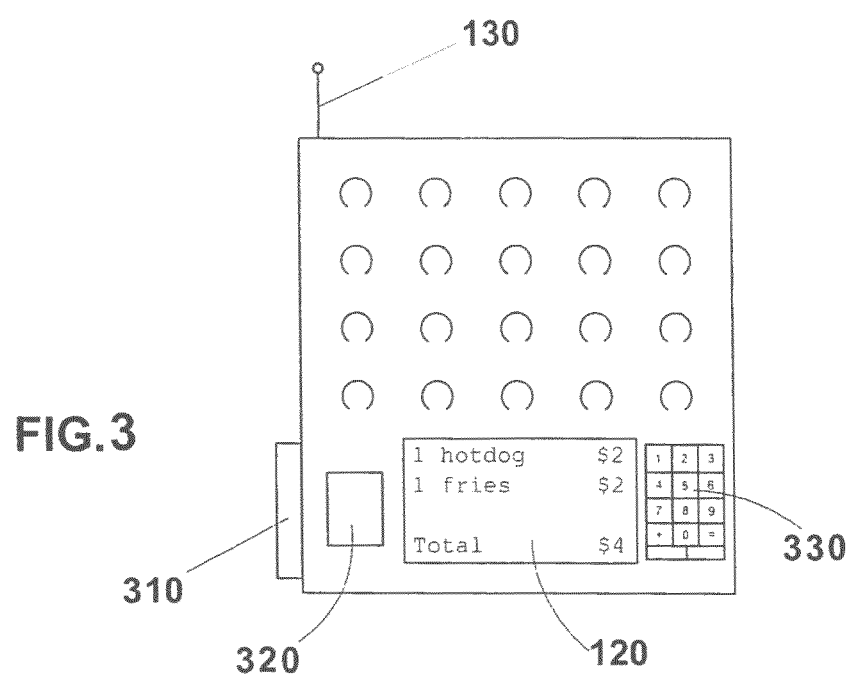
FIG. 3 shows a front view of a second preferred embodiment of the invention.

A preferred embodiment of selection means 110 is membrane switch 210 shown in cross-sectional detail in FIG. 2. FIG. 2 shows a coating layer 220 wrapping around the edges of the menu. While the coating layer is shown as a continuous unitary layer, various sealing methods can be employed at the edge to join two or more layers of coating material together to form a liquid-resistant barrier. Membrane switch 210 is made of a first conductive material 221, a second conductive material 222, and a switch portion shown as an elevated pressing portion 211 of outside coating 220 and corresponding biased region 223 of first conductive material 221. When the pressing portion 211 is depressed by a user, the biased region 223 of first conductive material 221 comes into contact with the second conductive material 222 and a selection is sensed. The membrane switches can further be provided with a visual feedback device (not shown), such as an LED, movable graphic, or other visual indexing apparatus, to show that a particular membrane switch 210 has been selected, and in some circumstances, how many times the membrane switch 210 has been depressed, for example, to indicate a desired quantity of a desired menu item. This visual feedback device may be employed with or without a separate display. Other configurations having similar functionality to the above described membrane switch, such as a membrane switch having a flat or concave pressing portion that is depressed to activate the switch, are also contemplated. Remote transmitting device 130 is shown in FIGS. 1 and 3 as an external antenna; however, as an alternative to or in conjunction with the external antenna, an internal antenna, docking station, network cable (such as a phone line or Ethernet cable), or infrared transmitter can also be used. The remote transmitting device can use wireless data transmission such as infrared beam or radio waves (including typical 802.11 standards, BLUETOOTH technology, or cellular phone bandwidth) or wired data transmission to send an order, along with identifying information such as name, table number or general location, to a receiving device 140 located, for example, in a food preparation area of a restaurant, to an inventory location, or to a wait-staff location. The receiving device can be a standard personal computer running a software program to receive and process orders sent from the electronic menus, or it can be a specialized device developed solely for use with the electronic menus. Additionally, the menus may be able to communicate with other menus, providing an ability to send messages, pay for all or just selected items, play games, or otherwise interact. In a further embodiment shown in FIG. 3, the remote ordering system can include a payment means 310, a printer 320, or an alpha-numeric keyboard 330. The alphanumeric keyboard 330 as seen in FIG. 3 can be used to enter information regarding the meal including special instructions, requests, or comments. Also, the alpha-numeric keyboard 330 can be used to accommodate any of the various functions described above in conjunction with the display 120. Printer 320 can be part of the menu itself or located at the table. Printer 320 can be used for printing receipts, coupons, or other desirable printed material. Printer 320 can be a simple receipt printer for providing the customer a hard copy of their order. The printer can be directly attached to the menu, as shown in FIG. 3, or a separate device at the customer's table or at some remote location. Payment means 310 will be described in more detail in conjunction with the following embodiment.

As shown in FIGS. 4-18, the invention may include an electronic menu 400 having a plurality of menu pages 460 with menu items 500 listed thereon (see FIG. 5), a series of selection means 440 to select items listed on the menu pages 460, and a display 480 to provide visual feedback of the selected items. Menu pages 460 may be held in menu 400 by rings 430, or any other known page retention solutions. Menu pages 460 are preferably separated into sections labeled with tabs 450. The sections can include items such as Beverages, Appetizers, Salads, Specials, Entrées, Soups, Pizza, Pasta, Dessert, or any other grouping of items, food related or otherwise.

Menu 400 can employ an external antenna similar to remote transmitting device 130 shown in FIG. 1 and FIG. 3. As an alternative to or in conjunction with the external antenna, an internal antenna, docking station, network cable (such as a phone line or Ethernet cable), or infrared transmitter can also be used. The remote transmitting device can use wireless data transmission such as infrared beam or radio waves (including but not limited to typical 802.11 standards, 802.05 standards, BLUETOOTH technology, or cellular phone bandwidth) or wired data transmission to send an order, along with identifying information such as name, table number or general location, to a receiving device 140. Menu identification can be accomplished by having each menu appending a unique menu identification number to an order. Alternatively, a menu can be actively identified by user input, GPS triangulation, wireless triangulation, RFID transmission, or IP address.

The remote transmitting device 130 communicates with receiving device 140, which can be located in a food preparation area of a restaurant, an inventory location, or a centralized wait-staff location, or to individual wait staff. In other embodiments the receiving device may be offsite. The receiving device can be a standard personal computer running a software program to receive and process orders sent from the electronic menus, a beeper-type device, or a specialized device developed solely for use with the electronic menus. The communication can be one-way from the menu to the receiving device 140, or two way between the menu and a receiving device 140. The ordering system can include a broadcast station (not shown) that can send information to the menus 400 or to receiving device 140 or to both. The information can be updated menu information, specials of the day, advertisements, or other media.

Figure 4:
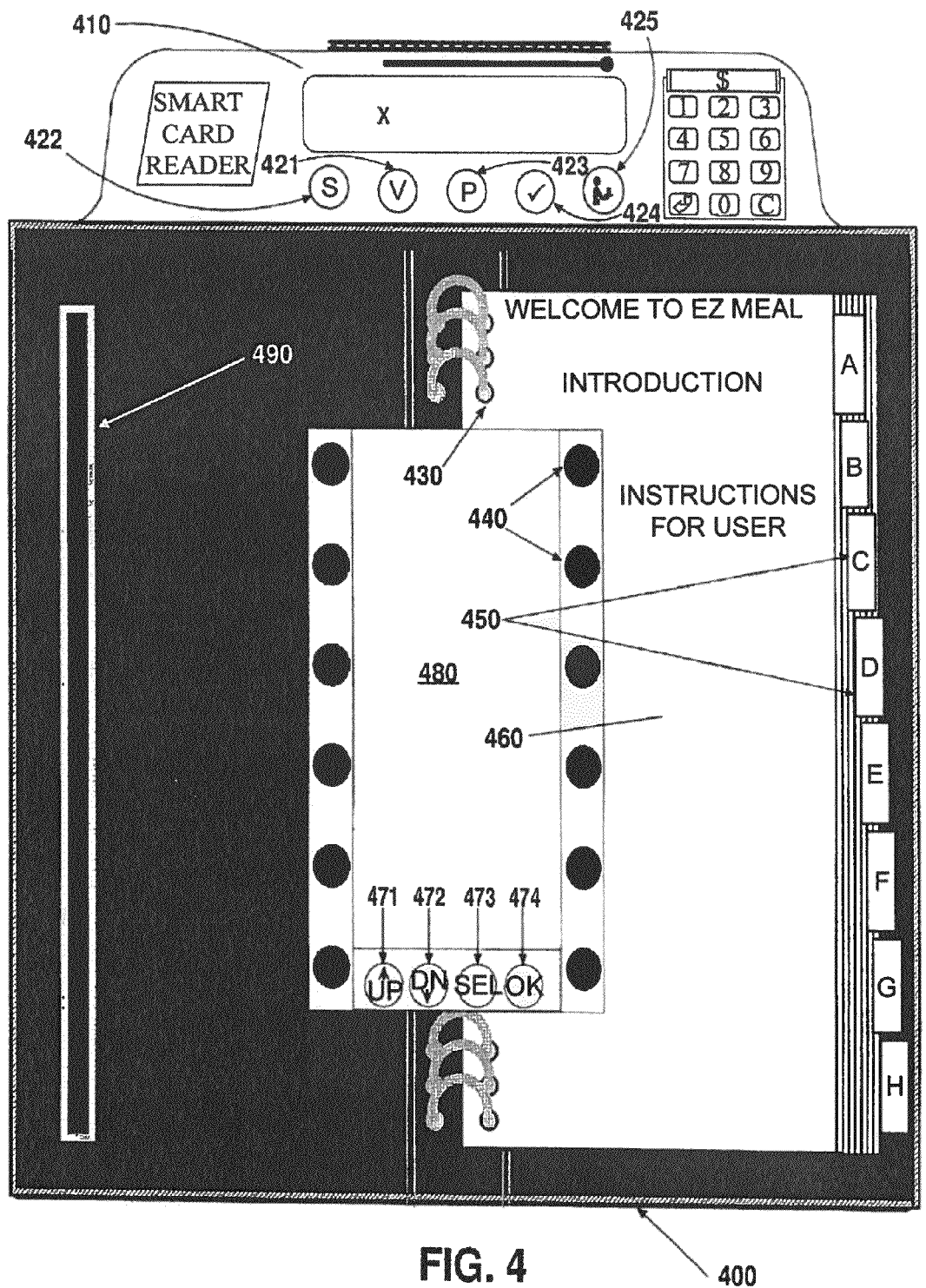
FIGS. 4-18 show a third preferred embodiment of the invention in various stages of use.

Display 120 as seen in FIG. 1 and/or display 480 as seen in FIG. 4 can be any appropriate display including, for example, a light emitting diode display (LED), organic light emitting diode display (OLED), a liquid crystal display (LCD), or electrophoretic display (EPD) used in e-ink or e-paper products. Display 120/480 can be color, black & white, grayscale, or a combination of displays. Display 120/480 can be provided with a backlight to increase visibility in low-light conditions. Display 120/480 can be capable of displaying text corresponding to items selected from one of the menu pages. Display 120/480 can also show item-related information such as item prices, descriptions, or meal options such as sides, toppings, dressing, or others accompaniments. The ability for display 120/480 to reproduce graphics, animations, video, etc. is also contemplated. Display 120/480 may also be flexible or rigid. A flexible display 120/480 can preferably allow a membrane switch placed beneath the screen to be depressed by applying pressure to a portion of the screen. In a preferred embodiment, the electronic menu includes reading lights incorporated into the menu. The reading lights can be in the form of backlighting or an attached external light that illuminates the pages of the menu for low-light visibility. Display 120/480 can provide, for instance, information regarding the type of food ordered, the quantity of food ordered, and the price of the food ordered. The display 120/480 can also provide other information such as various options for food items (e.g. fries or mashed potatoes); sizes (e.g. a large soda versus a small soda); doneness (e.g. well done versus medium rare); special requests (e.g. "hold the onions"); upselling requests (e.g. "would you like a drink?"); nutritional information; allergy precautions; wait time; server name; business or advertising graphics; or any other informational or decorative indications desired. Also, the display 120/480 can be used to provide non-menu items such as games, puzzles, or trivia. The display 120/480 can furthermore be used to request information from customers regarding typical survey information drawn to the quality of the services rendered, as well as personal information to be used for marketing purposes. The display can be used to show incoming or outgoing text-messages from others within transmission range of the menu, or using third party messaging services.

In one set of embodiments the menu pages can be made similar to that of standard menu pages, such as a series of printed pages listing menu items. In some embodiments, the menu items can be provided with images that further describe them. The pages can include, for example, paper or plastic sheets that can be attached directly to the menu or can be inserted or laminated in a protective sheath that is attached to the menu. The page may also be formed with e-ink or e-paper that can be updated electronically.

As seen in FIG. 4, the invention may include a page indexing means 490 for detecting to which pages 460 menu 400 is opened. Page indexing means 490 is used to update the selection means so that they correspond to new items listed on open pages 460. If the page for salads is open, selection means 440 will register to a particular salad. The selection means is likewise updated to correspond to new items listed on subsequent pages. The page-indexing means 490 can include a detector along the side or bottom of menu 400 to sense the page to which the menu is turned. Page indexing means 490 also includes some indication of page number on each page 460 such as optical, magnetic or electrical measures in each of tabs 450 or along an edge of menu page 460. When a page is turned, the selection means can be updated to reflect varying items on different pages. For example, on a first page, a selection means can correspond to item A, but when the page 460 is turned, that same selection means can correspond to an item B. Page indexing means 490 can include optical sensors, magnetic switches, physical switches, etc. Page indicators, such as magnetic, reflective, mechanical, or radio-frequency measures, can be located in or on the menu page 460, laminate, or sheath. It is noted that the reflective measures used for page indexing can reflect specific wavelengths of light, such as ultraviolet, visible, microwave, or other suitable wavelength. In one embodiment, the menu can be provided with an initialization procedure whereby the locations of pages 460 can be learned by opening the menu 400, and turning the pages. Upon sensing each turned page 460 as it triggers the page indexing means 490, the menu is calibrated to the ordering of each successive menu page 460. This way, information stored in the menu's memory for Appetizers, for example, will be associated to the Appetizer's page regardless of the order in which the menu pages are assembled. Alternatively, the menu pages can be stored in a pre-set order corresponding to a pre-set storage methodology where "Appetizers," for example, must appear on a certain page number.

Figure 8:
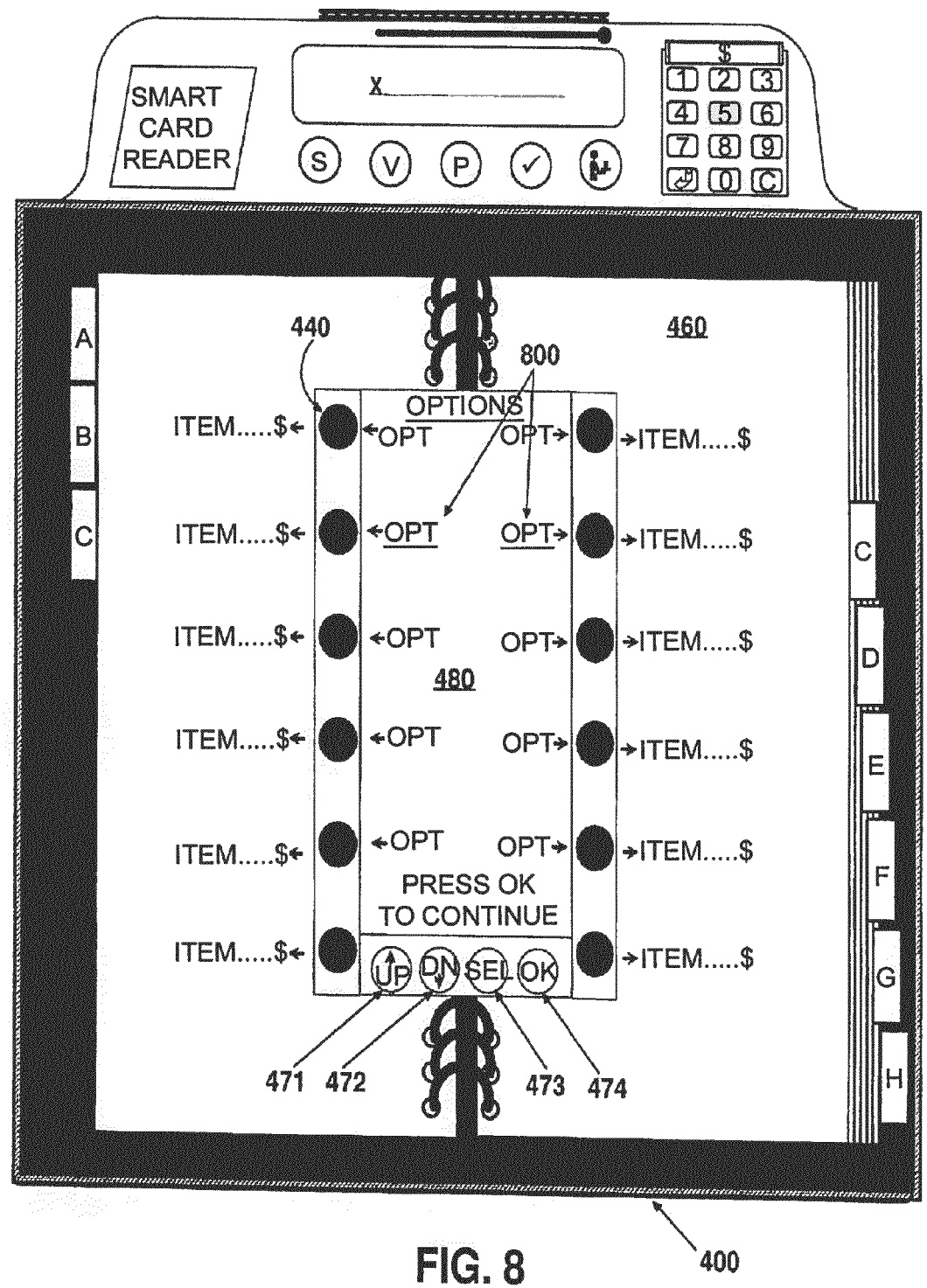

In one embodiment, selection means 440 can be situated along at least one edge of the display. As seen in FIG. 8, selection means 440 located alongside the display 480 can function to select items listed on menu items 500 located on a menu page adjacent a first portion of the selection means 440, as well as to select optional items 800 located on the display adjacent a second portion of the selection means 440.

In one embodiment, the selection means is in the form of membrane switches. The membrane switches are preferably water resistant, durable, and are able to provide tactile feedback to a user. Alternative input devices can include a joystick having a protrusion that can be manipulated in a variety of directions to correspond to selection of a menu item; a scrollwheel having a peripheral region capable of sensing rotation, where clockwise rotation scrolls through a list of items in one direction and counterclockwise rotation scrolls through the list in an opposite direction; or verbal input through a microphone and in conjunction with speech recognition software. A set of service buttons 421-425 can be included on the menu that correspond to various functions such as initiating menu ordering 422, calling for a waiter/waitress 425, verifying an order 421, placing an order 423, or requesting a check 424. Use of these buttons will be discussed later in the specification.

Payment means 310 in FIG. 3 and/or payment means 410 in FIG. 4 (hereinafter "payment means 310/410") is used to optionally pay for items without the need for a waiter/waitress to deliver and process a check. Payment means 310/410 can include either contact or non-contact payment devices. The payment means 310/410 can accept credit, debit, or gift cards employing magnetic stripes. Alternatively, the payment device can access wireless payments from a smart-chip, such as a smart card or payment fob, or other non-contact information system such as near-field communication RFID devices, wireless or cellular payment using a stand-alone device such as a cellular phone or personal digital assistant (PDA).

In one embodiment, the feedback means is a display with selection means 440 being areas on a touch screen overlaying the surface of the display that correspond to words or symbols on the display beneath the touch screen. With this configuration, the touch screen can function as a signature pad to digitally capture the customer's signature for verification or record-keeping. This digital signature may be optionally printed on a receipt or invoice to preserve a hard copy of the transaction. Alternatively, a resistive or conductive separate touchpad or electric signature pad 1640 as in FIG. 16 can be used to capture signatures, biometric, or forensics information. Because this input device can capture written information through a stylus 1650 or other gesture based input device, including a user's finger, it may further be used to input information not related to payment uses, such as adding special requests to an order or to fill in suggestions for the establishment.

The menu can be powered by any of a number of available methods. These available methods include wireless power, rechargeable batteries, fuel cell, replaceable batteries, solar power, or mechanically stored energy. In a preferred embodiment, rechargeable batteries are stored within the menu and are charged via non-contact, or inductive, charging. This is usually accomplished by having one set of coiled wire encircled by another set of coiled wire, where current flowing through one of the coils induces a current flow in the other set of coils. This induced current is then used to charge a battery. It should be noted that inductive current can be achieved using any conductive materials, and the invention involving non-contact or inductive charging is not limited to encircled coils of wire.

The menu is preferably constructed and arranged so as to be durable and rugged. Because of the use around food and drink, the display may be substantially fluid-resistant. The circuit can be sealed by a gasket or encapsulated in a fluid-resistant material. Furthermore, a flexible circuit can be used to allow for a certain degree of pliability of the menu. Similarly, the display can be made of a flexible material such, such as that used in e-ink or e-paper displays. The menu may include audio feedback to indicate that a selection has been made, or that some other event has been triggered. This can include an incoming message from the kitchen saying the meal is ready. It can be related to advertising, it can be user-provided music from a customer's storage device, or music selected from a virtual jukebox accessible through the menu. The menu may also provide feedback in the form of smell. Various chemicals can be released from the menu to simulate certain desired smells. These smells can correspond with food items or can be provided to deliver a certain environmental experience such as the outdoors. The menu can provide for language options to accommodate various spoken languages. For example, the menu can include a first grouping of pages in one language followed by a second grouping of pages in a second language. Alternatively, the menu pages can be swapped out to provide alternative languages. In either case, the central display would likewise be updated depending on the language displayed on the pages. In a preferred embodiment, the menu can be associated with a central docking station located at each table. The central docking station can provide various support functions for the menu such as printing capabilities, wired or wireless transmission means, a recharging station to recharge the menu's batteries if batteries are present, an electricity transmission means for wireless powering of the menu, and a place to store the menus when not is use. Because the menu may be a wireless handheld device, anti-theft means can be employed to prevent customers from leaving the restaurant with the menus. Such anti-theft devices could be radio-frequency identification (RFID) tags, tethers, location tracking to locate a menu location and an indicator of when the menu leaves a predefined area, or any other known antitheft devices employed on merchandise, clothing, or laptop computers.

A separate software program is contemplated to provide a user-friendly method of creating menu pages or a graphical overlay for an electronic menu herein described, here the program can assign new menu items to corresponding input means locations and update the menu's computer program accordingly. The updating can be achieved either wirelessly or through a physical connection, to match up with the newly printed media. The menu program can include additional functions such as a tip calculator. It should be noted that a preferred embodiment of the electronic menu of the present invention, the program used to run and update the electronic menu uses a low-level programming language such as C++ that can be stored on a chip, as opposed to an application that requires an operating system to interface with the hardware. This improves reliability, decreases required processing power and memory requirements, requires little to no cooling, and takes up less room than a typical tablet pc or laptop running an operating system.

FIGS. 4-18 show an exemplary step-by-step method of using the menu. The menu 400 can include a payment structure that allows a user to pay for a set of selected items. FIG. 4 shows the instructions for use that are printed on the back of the Beverages or first menu page 460. This is the first page a customer sees upon opening the menu 400. Subsequent pages contain the specific fare offered and navigation keys 471, 472, 473 and 74 are used to manipulate and/or select information displayed on display 480.

Figure 5:
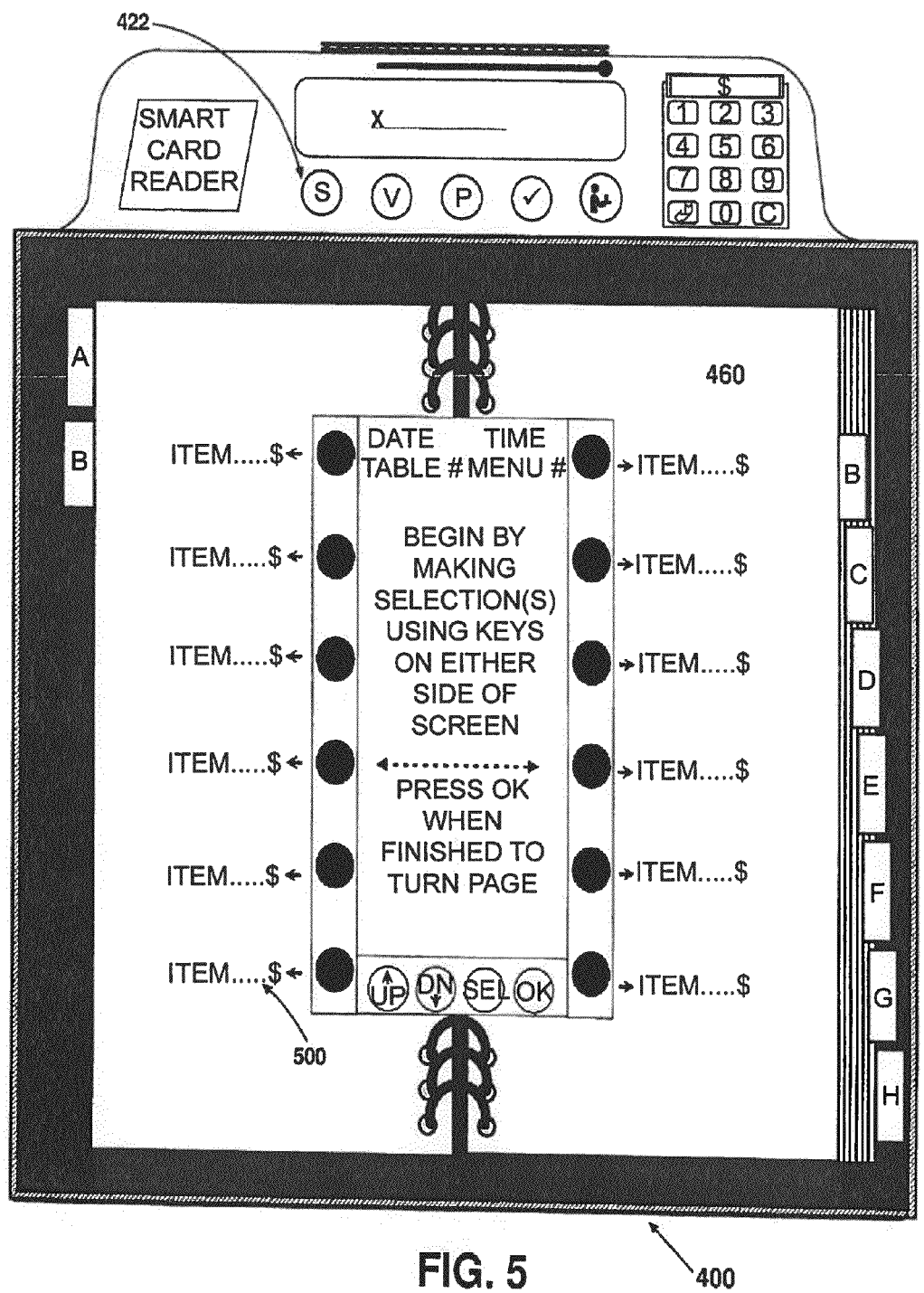

FIG. 5 shows a sample appearance of display 480 after customer presses the start button 422 and turns page 460 to the "Appetizer" section before making a selection. The Table #, Date, Time and Menu # appear on the display 480 along with the "Welcome to the XYZ Restaurant" Greeting and the Instructions to make selections using the Selection means 440 on either side of the display 480. The Greeting and Instructions disappear once the first selection is made.

Figure 6:
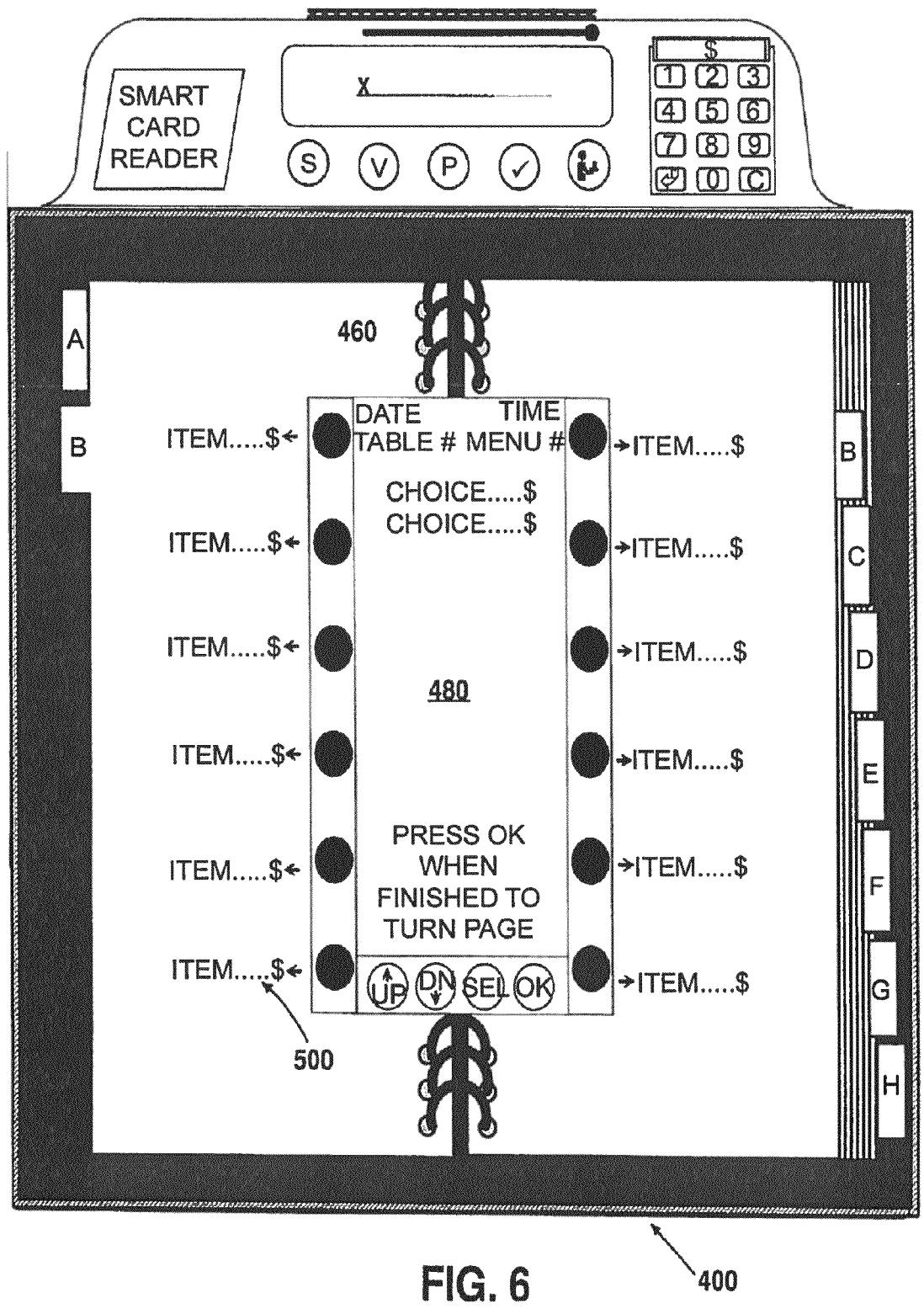
Figure 7:
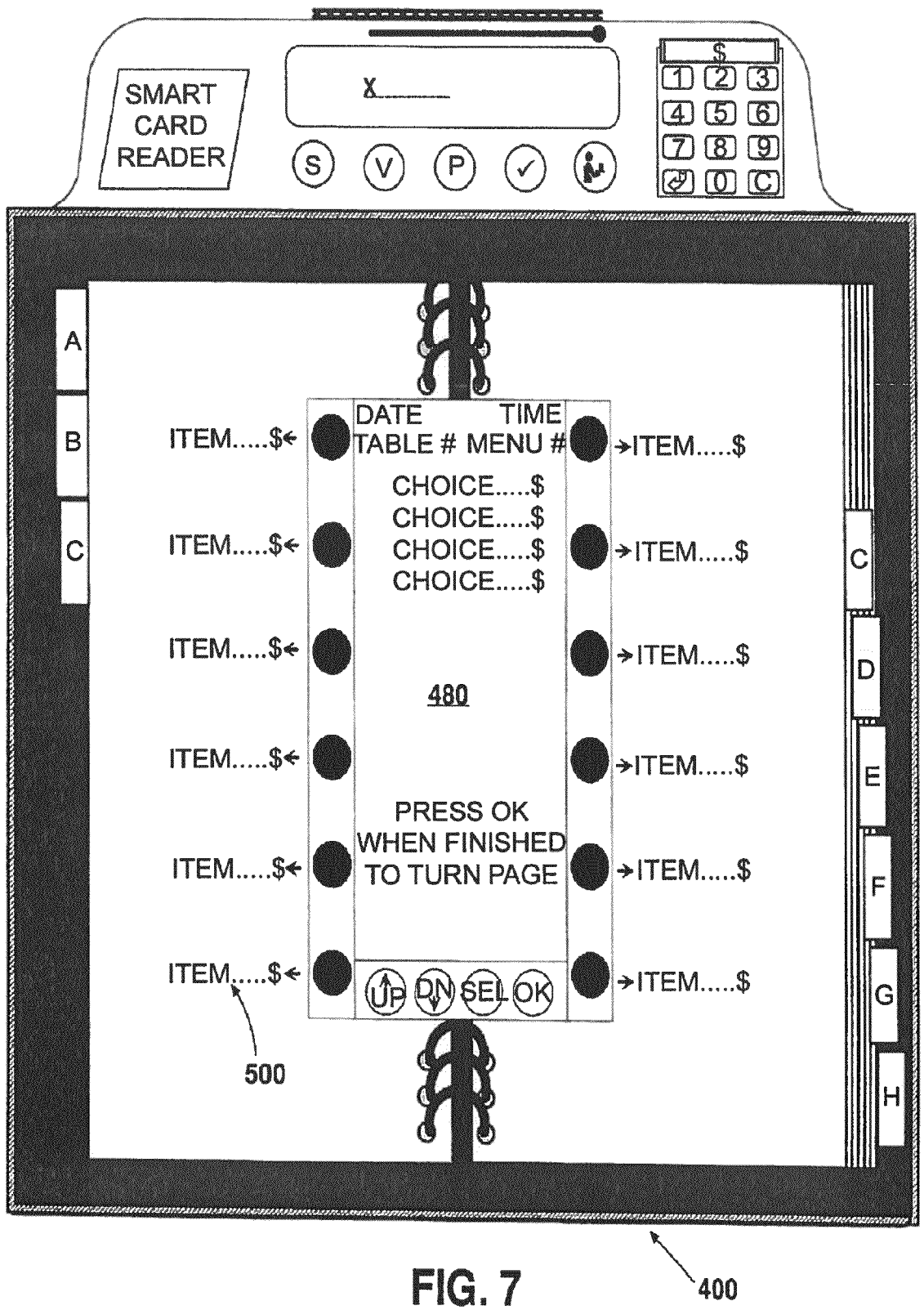

FIG. 6 shows the appearance of display 480 after a customer has made two selections 500 from the listed pages, here under Appetizer fare. An abbreviated or shortened description for each item appears on the display 480 with the price. Customer is instructed to press the OK selection key 474 and turn to the next page 460 to make another selection. Alternatively, the page can be turned without pressing the OK selection key 474. FIG. 7 shows the appearance of display 480 after a customer makes two selections 500 from the listed Salad fare. An abbreviated or shorten description appears on the display 480 with price. Once the Green Salad is selected a different screen appears on display 480 that allows the user to select options 800 (in this case, salad dressing) as shown in FIG. 8.

Figure 9:
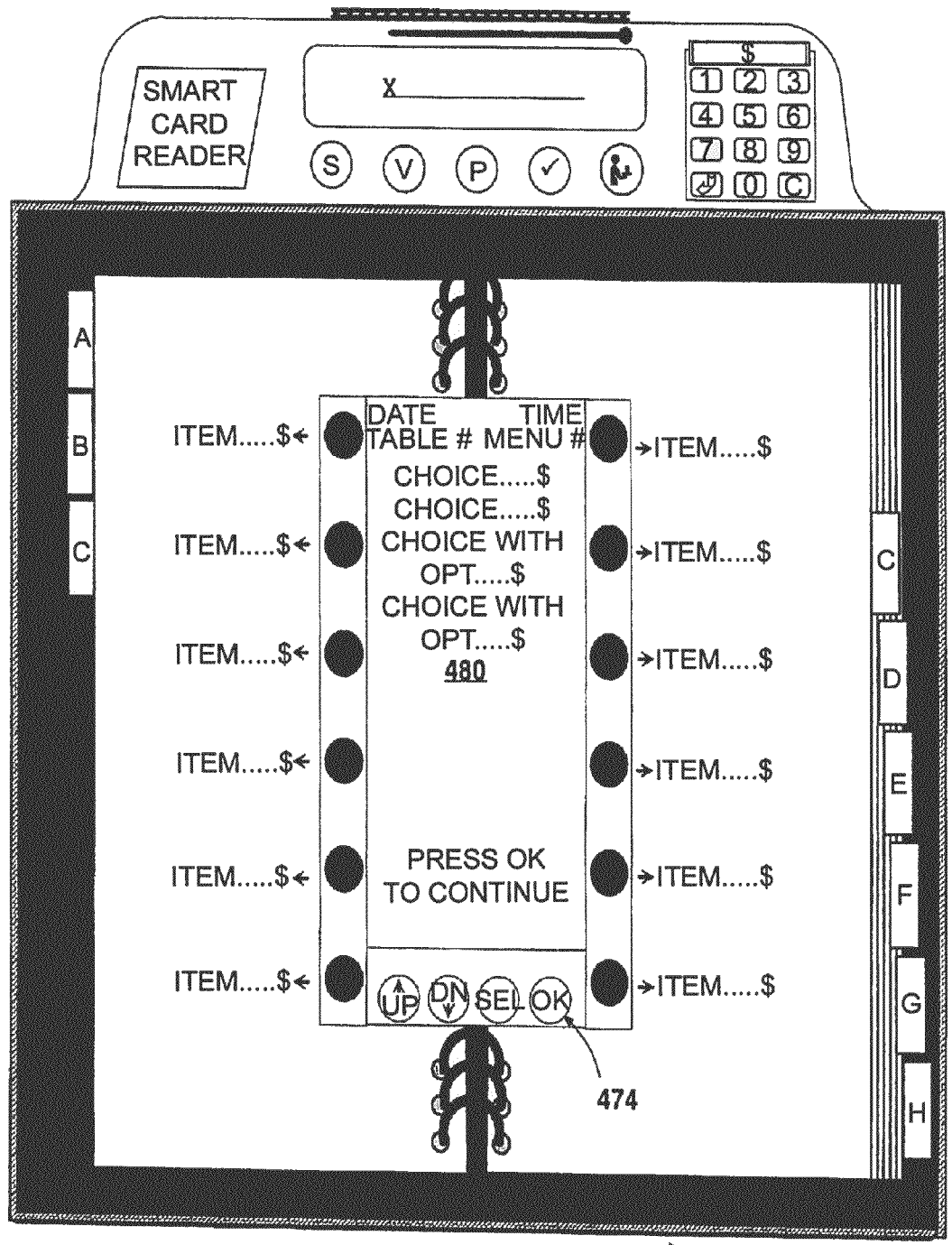

FIG. 8 shows the appearance of display 480 after a customer selects a menu item 500 that offers additional options 800 to accompany the previously selected item. Option 800 is displayed on display 480 adjacent selection means 440, which, when pressed, will correspond to a selection of an option 800. Once the selection means 440 is pressed, some indication of an option's selection can be displayed, such as an increase in font or an underlining of the option 800. When the OK selection key 474 is pressed the display 480 as seen in FIG. 9 appears. FIG. 9 now shows the selection 500 with selected option 800 appended thereto. Navigation keys 471-474 can preferably be used to modify or delete previously selected items that are displayed on display 480.

Figure 10:
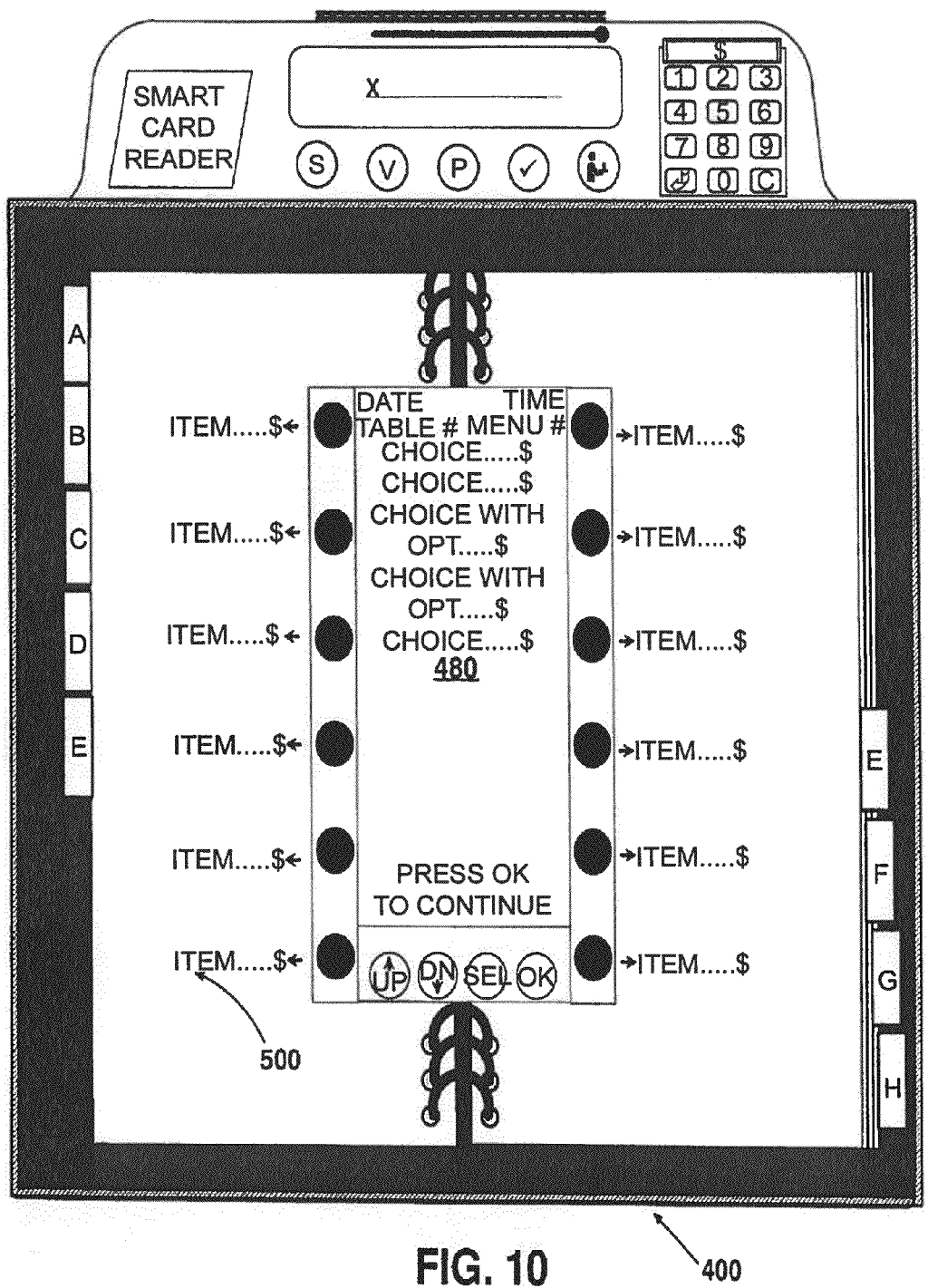
Figure 11:
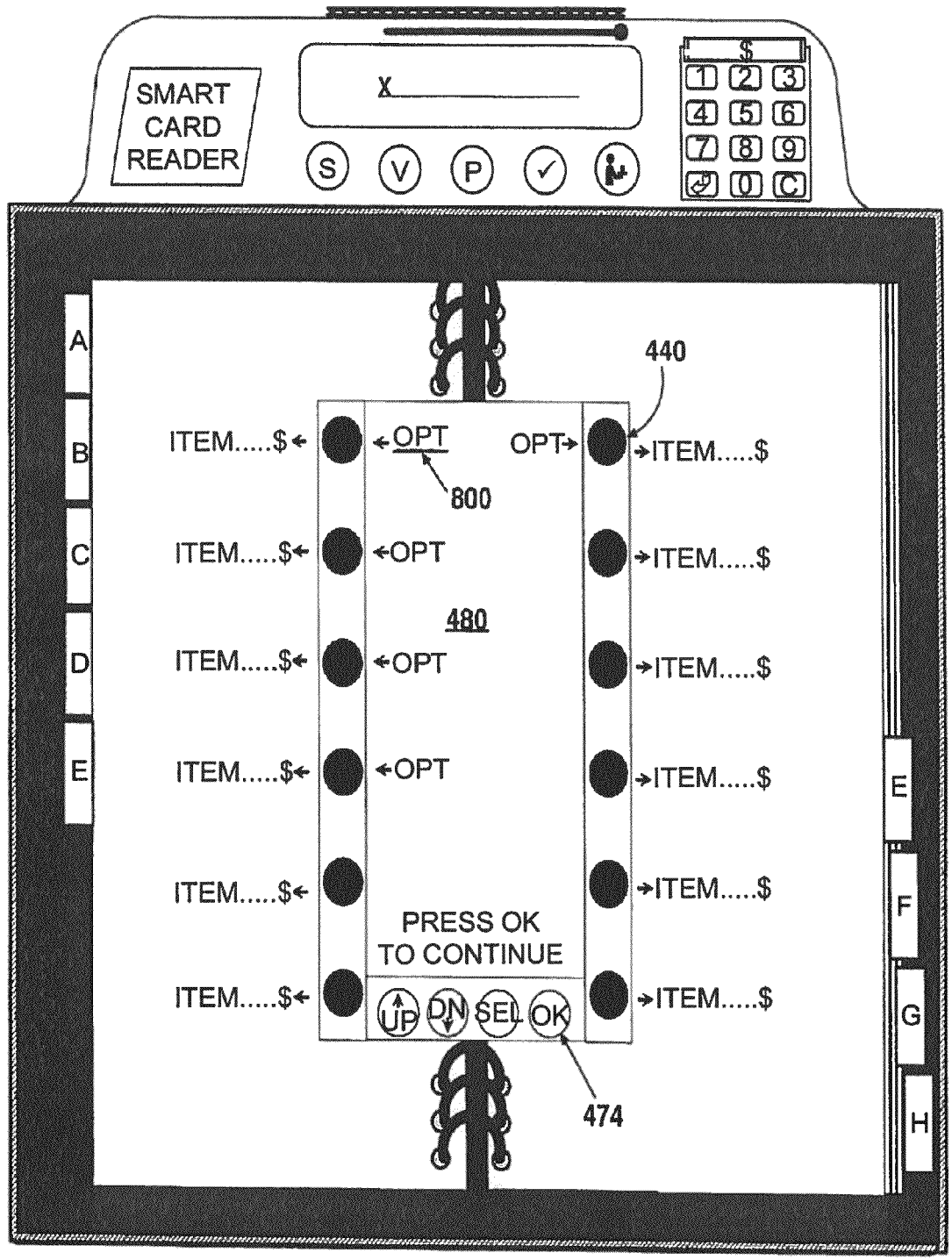
Figure 12:
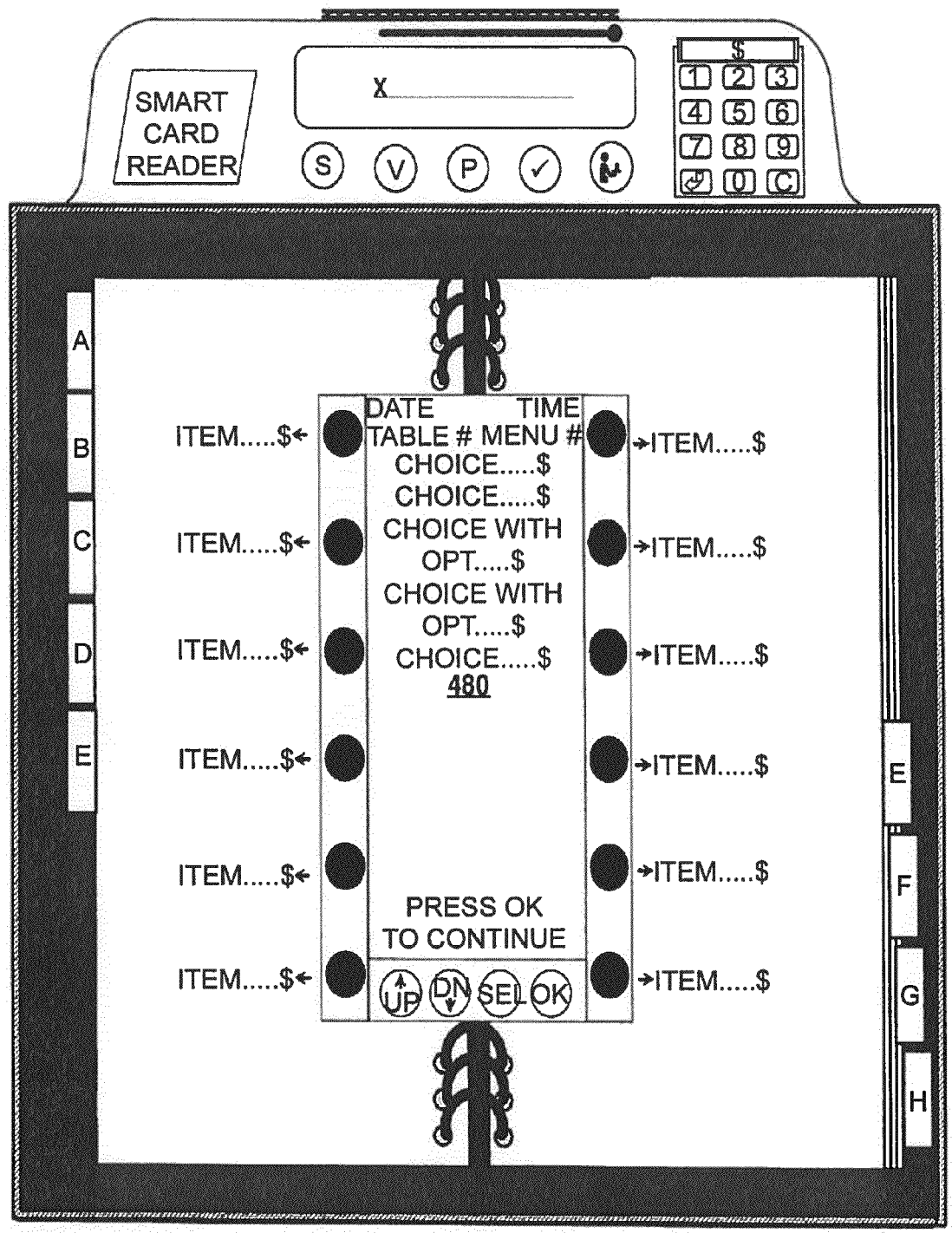

FIG. 10 shows the appearance of display 480 after a customer turns page 460 to Entrées page and makes a selection. As before, an abbreviated or shorten description appears on the display 480 with price. Whenever a beef item is selected, cooking and topping options appear. The customer can use the selection means 440 to choose the desired cooking level and toppings options 800 listed on the display 480 next to selection means 440. Once the selection means 440 is pressed, some indication of its selection can be displayed such as increased font or underlining. FIG. 11 shows the appearance of display 480 after a customer makes three selections from the list of options 800 using the selection means 440. Once all the options are selected, the OK selection key 474 is activated to move on to the screen as shown in FIG. 12.

Figure 13:
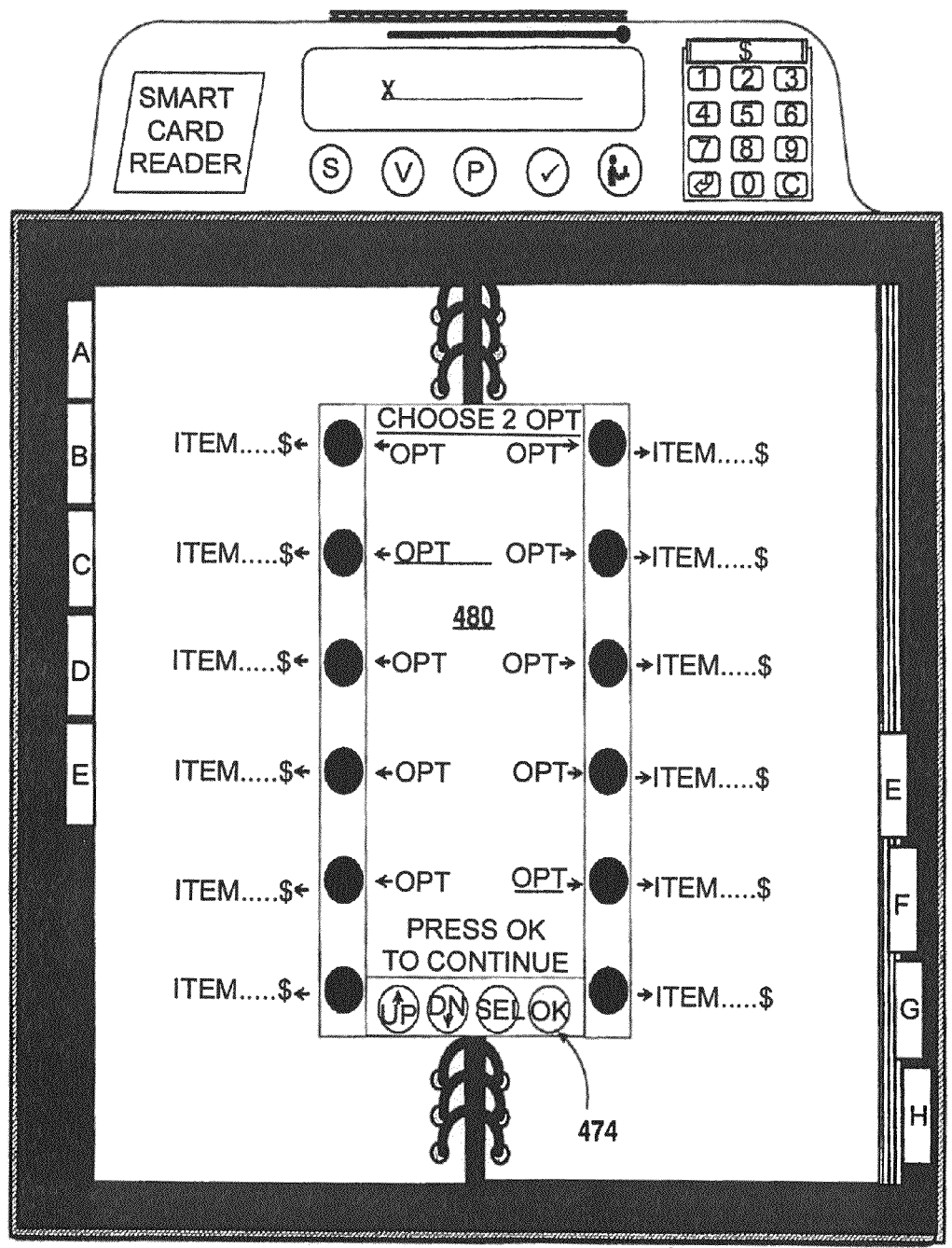
Figure 14:
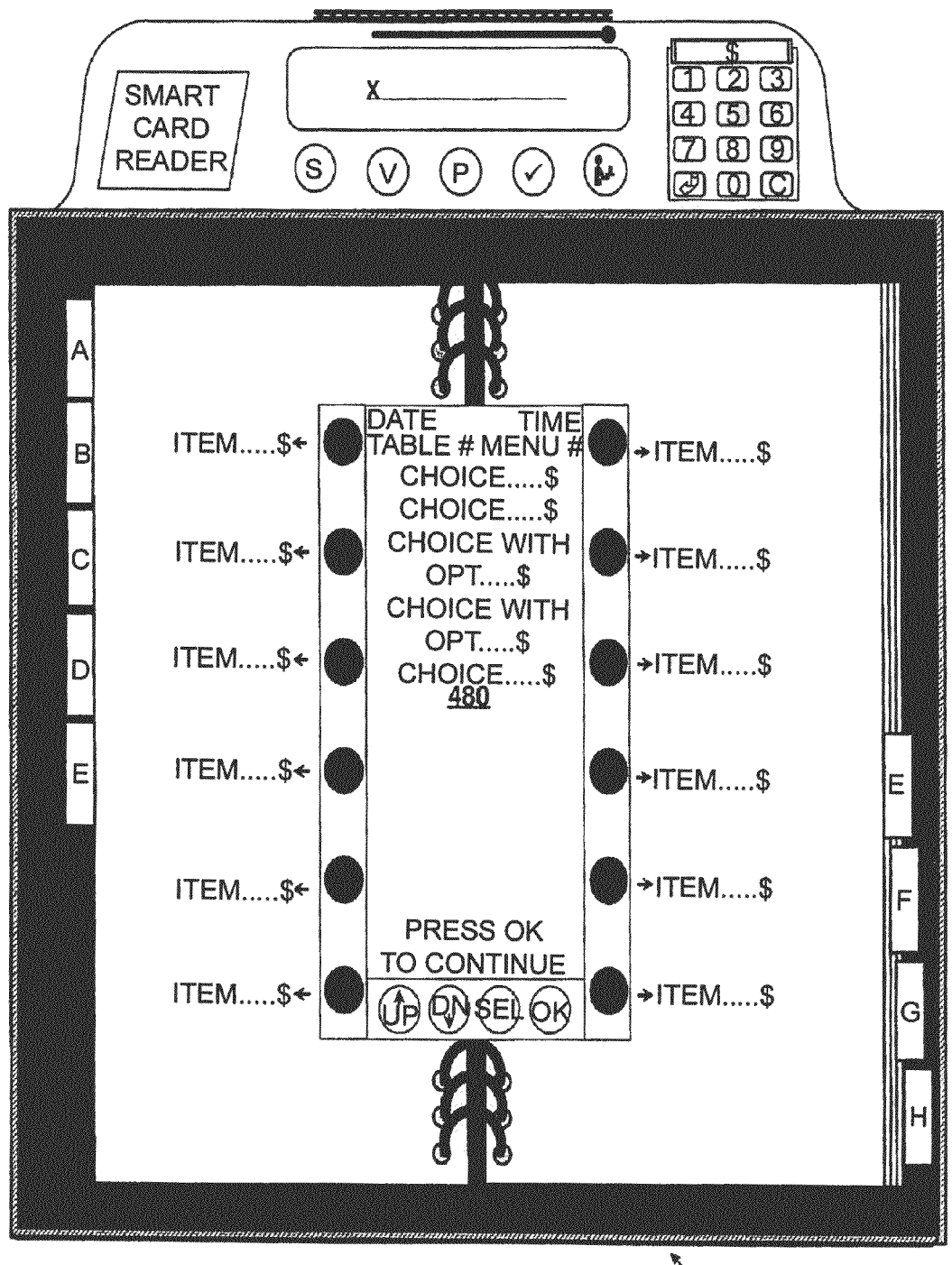

FIG. 13 shows another screen where available side dishes are displayed after selecting an entrée. The customer uses the selection means 440 to make 2 selections with some indication of their selection such as increased font or underlining. When the customer presses the OK selection key 474, confirmation is displayed as seen in FIG. 14.

Figure 15:
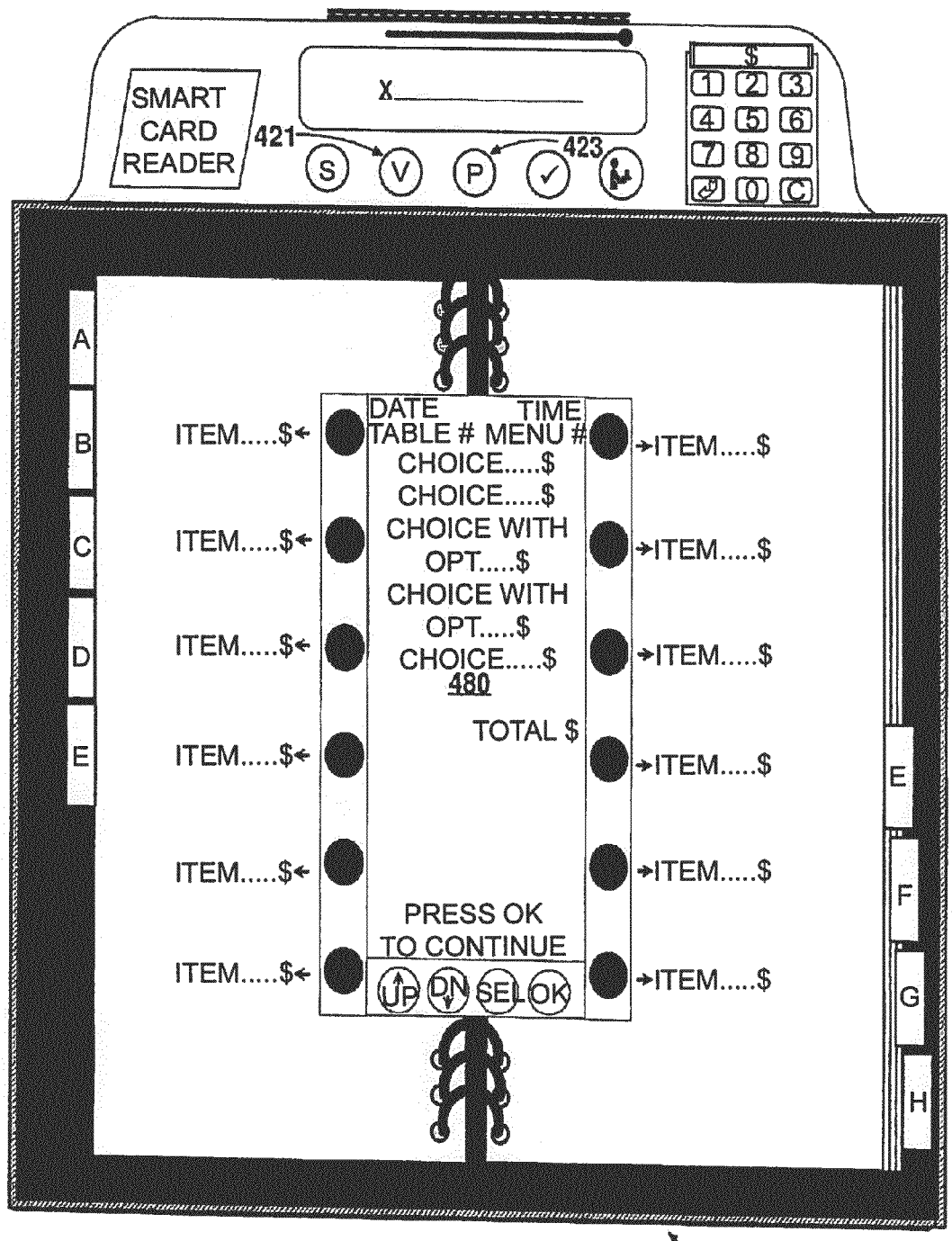

FIG. 15 shows a screen on display 480 after the customer finishes making all his selections and the verify order button 421 is pressed. The display 480 can then display the total order cost amount. If satisfied, the customer activates the place order button 423 to send the order directly to a receiving device 140 (discussed above).

Figure 16:
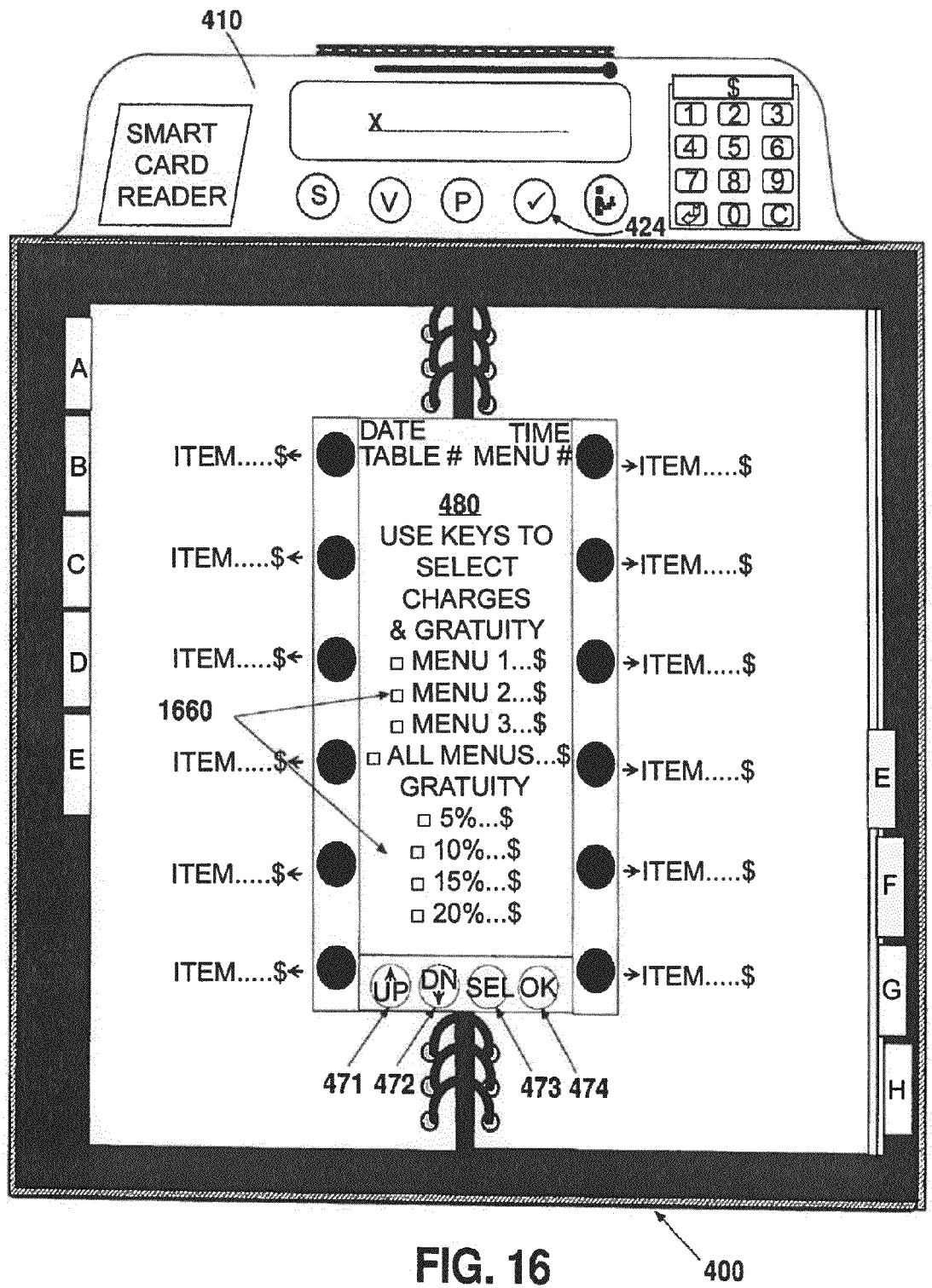
Figure 17:
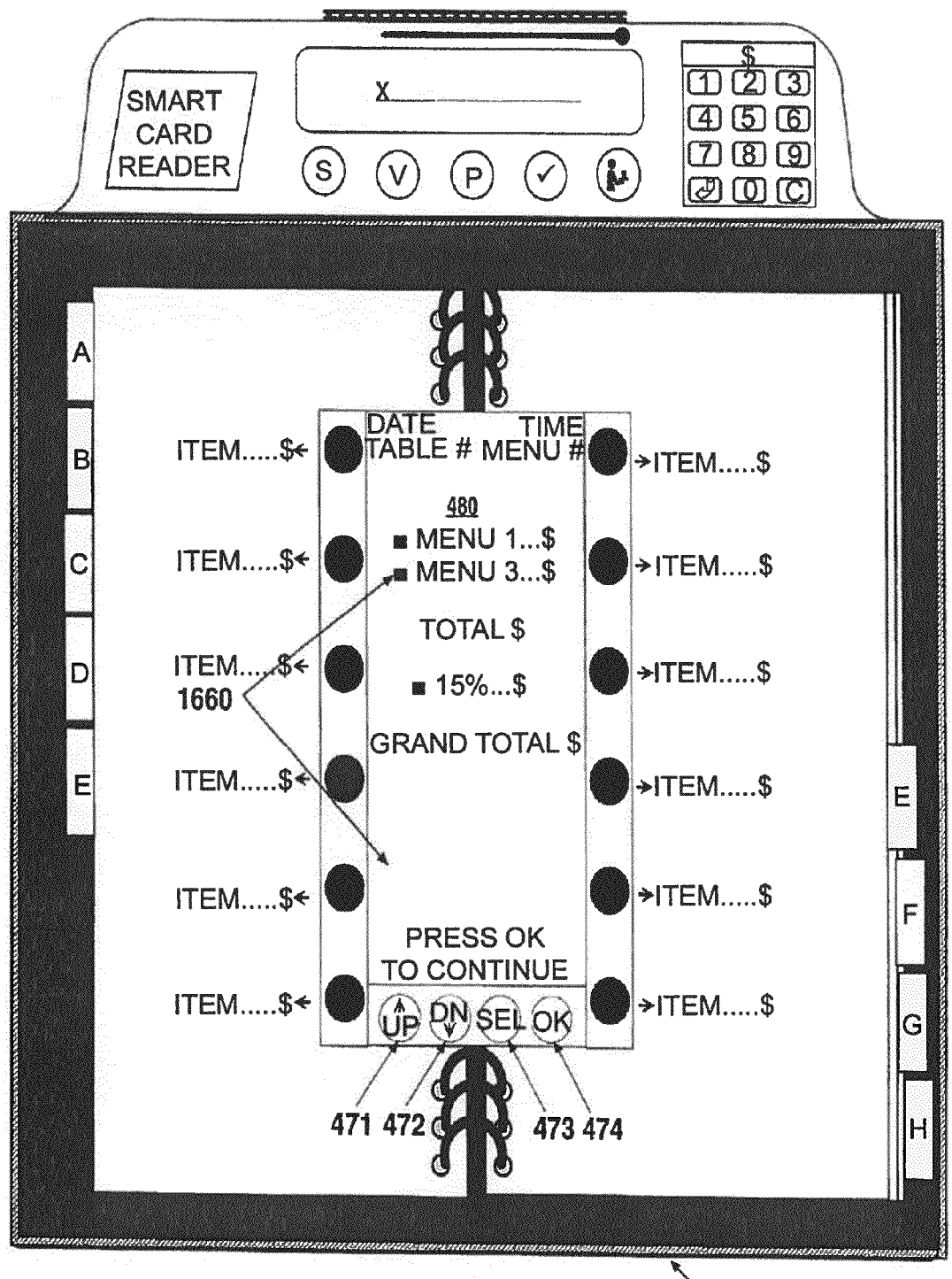
Figure 18:
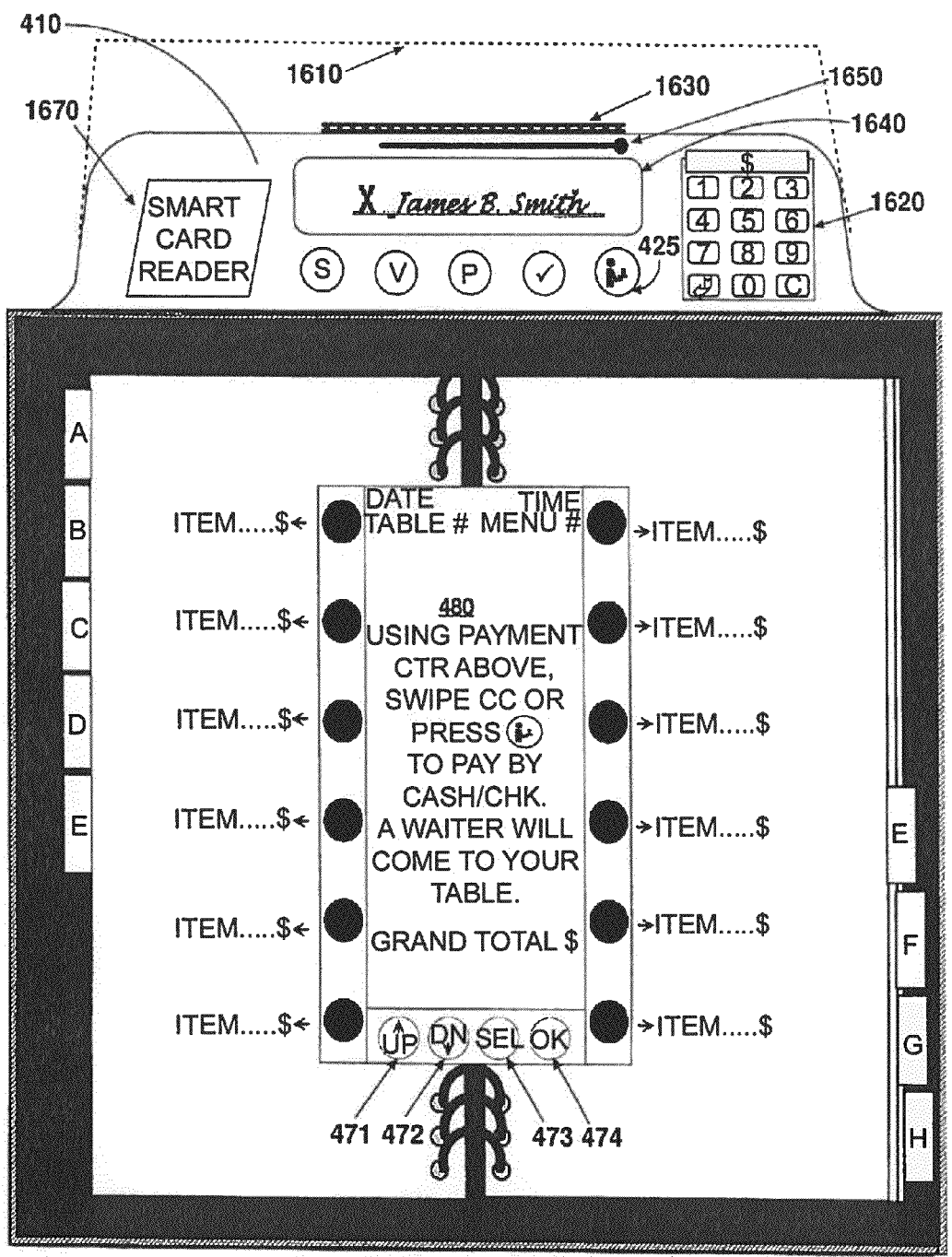

FIGS. 16-18 portray payment means 410 in greater detail. After the check request button 424 is activated, a summary of menu totals is listed on display 480. Instruction on display 480 say to use navigation keys 471, 472 and 473 to navigate through the payment selections 1660 including individual menus or the entire bill, and also the percentage gratuity to add to the bill. FIG. 17 shows display 480 after a series of payment selections 1660 have been selected using the navigation keys 471, 472 and 473. Payment selections 1660 include a listing of selectable menus to pay for, an option to pay for all of the menus, and several gratuity percentage options. Once the appropriate options are selected, the "ok" navigation key 474 is depressed to go to a payment options screen.

FIG. 18 shows the payment options screen on display 480. Payment means 410 can be uncovered throughout the ordering process as is shown in FIGS. 4-18, or alternatively, can be provided with a cover 1610 (shown in ghost) that is raised to access the various features of payment means 410. Cover 1610 is preferably a transparent protective cover, but can optionally be made of any durable material. Magnetic strip reader 1630 can be used to pay with conventional credit cards.

Stylus 1650 is used to sign signature pad 1640 to authorize credit card payments. Alternatively, magnetic strip reader 1630 can be used to read a debit card, with alphanumeric keyboard 1620 being used to insert a pin number or other identifying information. The keyboard 1620 can also be used to calculate a custom gratuity, or to enter other text or numerical information. Smart card reader 1670 can be used for non-contact payment methods. Other contact or non-contact payment devices can also be used, such as gift cards employing magnetic stripes, wireless payments from a smart-chip in a payment fob, near-field communication RFID devices, or wireless or cellular payment using a device such as a cellular phone or personal digital assistant (PDA). The instructions on display 480 instruct a customer to use the payment means 410 above, or press the service button 474 to pay by cash or check. If the service button 474 is pressed, a waiter will go to the table to deliver a check.

The menu can be used to pre-pay for a meal before ordering, similar to the way payment at a gas-pump is pre-authorized before pumping. Payment can also be made using cash by calling the waitress using a service button located at or near the menu. Additionally, when there are multiple menus used at each table, it is contemplated that each menu can have the option to pay for the items purchased from other menus at the same table. Payment for items at another table can also be accomplished. In one embodiment, there is a master menu that receives order information, including prices, from the other menus, and all order sending and payment is done through the master menu. This could provide better control over family or group ordering, and streamline the payment process. The electronic menu described above can be used in any field that may employ a menu, such as spa services, health and beauty care, movie or other performance theaters, concession stands, educational testing, means for conducting surveys, means for voting, or any business offering a limited number of products that can be displayed on a menu.

A revenue generating system based on supply and maintenance of menu service is also contemplated. Under this scheme, a revenue stream is provided to the menu provider as a percentage of sales accrued through menu use. The menu use can be in any field where the menus could be used as detailed above.

In another aspect, an electronic menu can be specifically designed to be customer friendly rather than tailored to the needs of wait staff. It can be used in any facility where traditional menus have been used, including, for example, restaurants, hotels, motels, sporting venues, movie theaters, clubs, trains, ships and airlines. The menu can include a traditional menu look while still being sophisticated enough to provide full capabilities including, for example, complete menu descriptions, multiple levels of sub-menus, wireless communication with a central processor, instant updating, integral payment devices and the ability to communicate the menu location to a central processor. The menu may have low processing and power requirements and can be operated absent expensive operating systems and microprocessors. For example, the menu may be operated by a microcontroller with embedded software and less than a megabyte of RAM.

Other features of the electronic menu may include, for example, two-way communication with a central processor; seat, table or customer location capability; and a continuously updateable menu that allows for instant price adjustments as well as removal, addition or reprioritizing of menu items.

In one embodiment, a system can include software that allows the menu to recall previous customers by communicating with a database that may be on board the menu, on a memory device at the premises, or on a memory device off the premises. The software may reside on the menu, a local server, a computer system located off site, or some combination of all three. The menu may identify the customer in any number of ways including, for example, a credit card or other auto-identifying payment means, querying the customer directly for his or her name, scanning of a frequent buyer card, or a biometric identification device such as a fingerprint reader or retinal scanner. The software may respond to someone identified as a previous customer by, for example, greeting the customer by name or altering the menu choices accordingly. For instance, the customer may be identified as having previously ordered only vegetarian dishes, and the customer may then be prompted by asking if he or she would like to see a vegetarian menu. In other instances, previously ordered items may be shuffled to the top of the menu. If the customer had previously ordered a specific drink, then the menu may be instantly updated with a drink menu that would be deemed to be of interest to the customer. As a payment option, the customer may be asked if they would simply like to use the same payment means that they have used previously. For instance, a previously used credit or debit card may be charged once the customer has been identified. Information regarding customer selections may also be recorded and used in targeted marketing databases that may used internally or may be sold to outside firms.

In other embodiments the menu may be customized based on immediate input from the user as well as from previously stored information. For instance, the menu may query the customer regarding allergies, nutrition preferences, food preferences, cuisine styles, price points or time limitations. In response, the menu may be updated or limited to include, for example, appropriate choices. For example, the menu may be updated to list items that are "dairy free," less than $20 per entrée, less than 500 calories, or require less than 10 minutes of preparation time. The menu may also provide customer specific advertising based on either previously acquired data or recently received information regarding the customer, or both.

In another embodiment the menu can be used to provide information regarding the location of the customer. For example, the menu can transmit data incorporating table, seat, or specific customer location information to a central processor (receiving device) so that a staff member is aware of the specific location of the customer. The customer's order can then be linked to his or her location so that food or drink can be accurately delivered. The customer's location may be identified by a specific table, a specific seat or simply a specific location that can be identified using a grid or other system. In one embodiment, each menu is assigned to a specific location and is meant to be used in that location only. In this case, any unique data associated with that menu can be used to determine its location. In another embodiment, the customer simply inputs his or her location either with or without prompting from the menu. For instance, the customer may point to a specific table on a touch screen display on the menu or may type or speak a table or seat number. In another embodiment, triangulation methods, signal strength methods, or other techniques may be used to pinpoint the location of the menu and therefore the customer. For example, the menu may communicate with two or more directional transmitters that allow the menu to be pinpointed within the restaurant or other service facility. In another embodiment, RFID tags or similar transmitting devices may be placed at specific locations in the restaurant. For example, a tag may be placed at each table location or each seating location. Tags may be placed out of view, for instance, under the table but in front of the customer. When it is desirable to transmit the location of the menu, the RFID tag can be read by the menu and can include identifying information that provides its specific location. This can be activated autonomously by the menu, by the customer, or remotely by a third party. The menu may include a power source capable of powering the RFID tag when it is within a specific distance of the tag. For instance, a menu may be programmed so that when a customer finalizes an order, the menu energizes a nearby RFID tag (e.g., within one or two feet) without energizing those that are outside of its range. The menu can then read the data transmitted by the tag and relay it to a central location where the menu's location can be made available to staff or other individuals. An order may be placed either before or after a menu's location is transmitted. For instance, a customer may place an order while in a waiting area but the menu may then transmit his or her location once he or she is seated at a table. The menu may also serve as a "table ready" notification device that directs the customer to a specific location once a table becomes available.

In one set of embodiments the menu can serve as a two-way communication device so that the menu can communicate with a centrally located processor (such as a server) and the processor can communicate with the menu. This path can also be used to provide communication between customer and restaurant staff. By allowing a central processor to send information to a menu, the menu can be remotely updated. For example, the processor may instantly delete or add menu items, change pricing, or change the description of an item. Additional non-menu information can also be provided, such as, the time remaining until an order is served or the time remaining until closing. In this manner, menus may be instantly updated to reflect changes that can affect sales. For instance, short term pricing specials may be employed to help promote menu items that may not be selling well. When the kitchen runs out of an item it may be deleted from the menu or, when appropriate, the item on the menu may be annotated with "only one left" or something similar. Menu updates may be provided locally by a local computer or local personnel. Alternatively, these changes may be made over a network, such as the internet, so that a single change can be implemented to update a plurality of menus at a plurality of restaurants.

Menus may also include devices for voice communication. For example, a menu may be equipped with a speaker and/or microphone for direct communication with kitchen or other personnel. The speaker and/or microphone may be wirelessly linked to a central processor which in turn can be linked to the kitchen or other location. In this way, kitchen personnel may contact a customer to confirm a menu choice or to obtain additional information to be able to fill the order to the customer's expectation. Similar communication can be performed by texting between the kitchen and the menu. In this case, a speaker and/or microphone may not be required.

In another set of embodiments, information being sent between the menu and a central processor (receiving device) may be encrypted. Thus, both the menu and the central processor may include encryption software on board. Encryption techniques may be chosen so that they conform to the requirements of credit card processors, banks, and others who may require encryption of any transmission that includes proprietary data such as credit or debit card information as well as the customer's identification.

A reader associated with the menu may be used to scan a form of identification such as a driver's license. For example, a magnetic reader integral to the menu may be used to scan a customer's driver's license whenever an alcoholic beverage is ordered. If two beverages are ordered, then the scanning of two licenses could be required before the order is fulfilled. The menu can then access a data base, either locally or remotely, to determine whether or not the customer is of legal drinking age. Alternatively, the driver's license itself may include information regarding the age of the customer. The system could also require a swiping of the driver's license with each successive order of an alcoholic beverage. In this way, the menu (or menu system) can keep track of the number of drinks served to a customer and can cease serving the customer when a specific limit is reached. An image of each customer may also be provided to wait staff so that wait staff is made aware of exactly which individuals at the table have placed the order.

Figure 19:
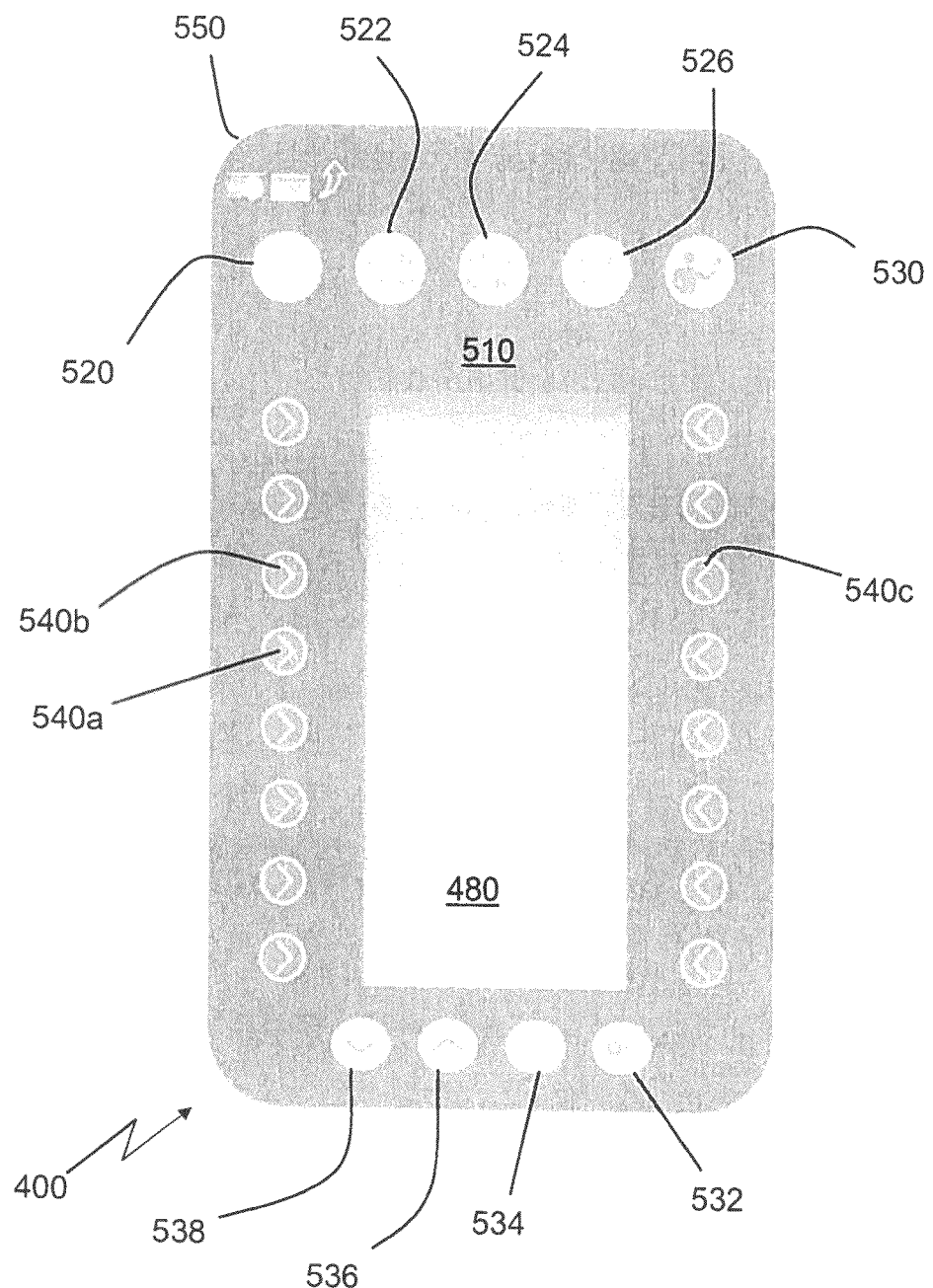
FIG. 19 provides a front view of another embodiment of the invention.
Figure 20:
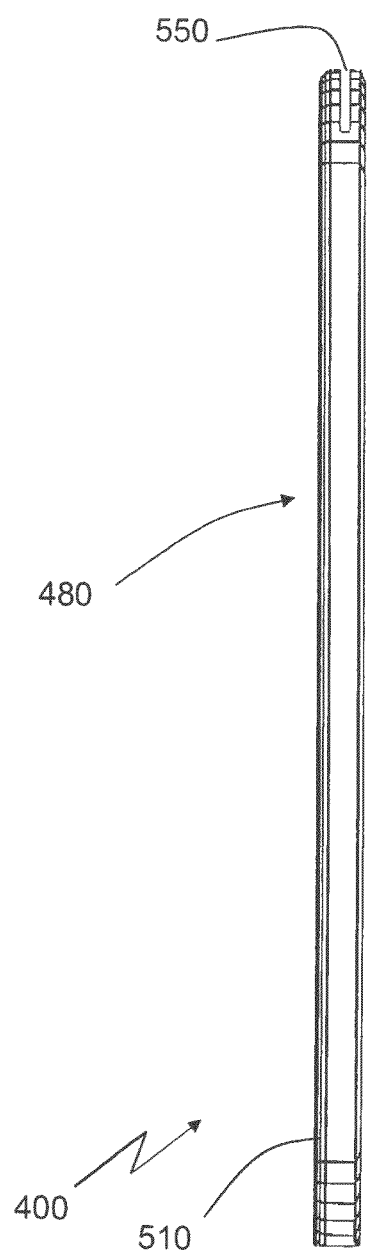
FIG. 20 provides a side view of the embodiment shown in FIG. 19.

FIGS. 19 and 20 provide a plan view and side view, respectively, of an embodiment of a hand held menu 400. The menu may be, for example, less than 10 inches tall, less than 6 inches wide and less than half an inch thick. The menu may be charged remotely and can include a wireless transmitter/receiver. Menu 400 includes a display 480 that may be used to display text only, images only, or both text and images. Display 480 may be a touch sensitive screen that can be used for input or may be simply a display screen such as monochrome or color LCD screen.

Menu choices may be displayed on display 480 so that they are aligned with one or more of switches 540*a*, 540*b*, 540*c*, etc. The switches 540 may include any appropriate input device such as a tactile membrane switch requiring movement or a capacitive switch that does not require movement in order to be activated. Once the switch associated with a menu choice is activated a sub-menu may be displayed on the same display. The sub-menu may provide an additional level of choices concerning the first menu choice. For example, if the first menu choice is for a beverage the sub-menu may display a list of wine, beer and soft drinks. In choosing a specific sub-menu choice by activating the corresponding switch, the customer may either choose a specific item or launch another level of menu choices. For instance, if soft drinks are chosen, then the sub-sub-menu may list water, orange juice, ginger ale, milk shake, etc. An unlimited number of menu levels may be accessed in this way.

Several switches are visible around the menu bezel 510. These may be membrane switches, capacitive switches or any other robust switch appropriate for the restaurant, hotel or club environment. Power button 520 can be used to turn the menu on and off. Switches 524 and 522 can be used to verify (review) an order and place an order. Switch 526 is activated when the customer wishes to pay the bill and doing so starts a bill paying routine that can ask the customer how he or she wishes to pay. A payment device, such as magnetic card reader 550, may be integral to the menu and can be used to swipe any readable object such as a credit card, debit card, gift card, driver's license, etc. The menu may also include a smart card reader and/or optical reader. Switches 536 and 538 may be used to scroll through text or objects and switches 532 and 534 may be used to verify or make choices. Switch 530 can be used to summon wait staff for assistance.

The menu may be operated by an inexpensive, low power microcontroller that does not require a higher level operating system such as Linux or Windows CE. It may be, for example, a thin client or similar device where the bulk of the computing power resides on a server or other processor that is not the menu. The microcontroller may include a microprocessor, memory and embedded software on a single device. In some embodiments, all software and memory are on the microcontroller. The on board flash memory may have a capacity of, for example, less than 256K, less than 128K, less than 64K or less than 32K of memory. One example of an appropriate microcontroller is a 24 bit microcontroller made by Microchip Technology, Inc. and sold as model number PIC™24FJ128GA. The embedded software may be written using any appropriate language such as, for example, "C."

Bezel 510 may be used to seal and surround display 480 and may include a variety of switches, as shown. It may also include indicator lights such as an LED to indicate that a table is ready for the customer. Bezel 510 may be printed with restaurant specific colors, designs, logos or other graphics that improve the attractiveness of the device and serve to associate the device with a particular restaurant or franchise. It may also include instructions for use or other useful information. This information may also be included on the back of the menu. The bezel may be permanently printed and in this case is not updatable by replacing the bezel.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A method for a customer to place an order at a restaurant, the method comprising:
    reviewing a series of menu choices on a first electronic menu having a display, a transmitter, a receiver, and a selection tool for selecting menu choices;
    selecting a menu choice;
    submitting an order to a central station using the first electronic menu;
    submitting a second order to a central station using a second electronic menu, the second electronic menu having a display, a transmitter, a receiver, and a selection tool for selecting menu choices; and
    paying via the first electronic menu for the order placed via the second electronic menu.

2. The method of claim 1, further comprising the step of communicating with a second customer electronically via the first electronic menu and the second electronic menu.

3. The method of claim 1, further comprising the step of receiving communication from the central station via the first electronic menu.

4. The method of claim 1, wherein the first electronic menu and the second electronic menu comprises a mobile computer.

5. The method of claim 1, further comprising the step of hearing feedback from the first electronic menu.

6. The method of claim 1, wherein the step of paying for the order occurs using a payment selected from the group consisting of: credit cards, debit cards, gift cards, and Smart cards.

7. The method of claim 1, further comprising the step of updating the first electronic menu remotely from the central station.

* * * * *